United States Patent
Nakhjiri et al.

(10) Patent No.: US 9,210,138 B2
(45) Date of Patent: Dec. 8, 2015

(54) EFFICIENT KEY GENERATOR FOR DISTRIBUTION OF SENSITIVE MATERIAL FROM MULTIPLE APPLICATION SERVICE PROVIDERS TO A SECURE ELEMENT SUCH AS A UNIVERSAL INTEGRATED CIRCUIT CARD (UICC)

(71) Applicant: Google Technology Holdings LLC, Mountain View, CA (US)

(72) Inventors: Madjid Nakhjiri, San Diego, CA (US); Tat Keung Chan, San Diego, CA (US); Alexander Medvinsky, San Diego, CA (US); Eric J. Sprunk, Carlsbad, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 129 days.

(21) Appl. No.: 13/865,078

(22) Filed: Apr. 17, 2013

(65) Prior Publication Data

US 2014/0082359 A1  Mar. 20, 2014

Related U.S. Application Data

(60) Provisional application No. 61/702,192, filed on Sep. 17, 2012.

(51) Int. Cl.
*H04L 9/32* (2006.01)
*H04L 29/06* (2006.01)
*H04L 9/30* (2006.01)
(Continued)

(52) U.S. Cl.
CPC .......... *H04L 63/0435* (2013.01); *H04L 9/0822* (2013.01); *H04L 9/0841* (2013.01); *H04L 9/3066* (2013.01); *H04W 8/205* (2013.01); *H04W 12/04* (2013.01); *H04L 63/0442* (2013.01); *H04L 63/0478* (2013.01); *H04L 2209/80* (2013.01); *H04L 2463/061* (2013.01); *H04W 12/02* (2013.01)

(58) Field of Classification Search
USPC .................................. 713/150–153, 168–170
See application file for complete search history.

(56) References Cited

U.S. PATENT DOCUMENTS 6,178,506 B1  1/2001  Quick, Jr.
2002/0018569 A1  2/2002  Panjwani et al.
(Continued)

OTHER PUBLICATIONS

Zhang et al, "Privacy and security for online social networks: challenges and opportunities" Network, IEEE Volume: 24 , Issue: 4 2010 , pp. 13-18.*

(Continued)

*Primary Examiner* — Roderick Tolentino
(74) *Attorney, Agent, or Firm* — Fox Rothschild LLP

(57) ABSTRACT

A method provides end-to-end security for transport of a profile to a target device (e.g., a mobile computing device) over at least one communications network that includes a plurality of nodes. In accordance with the method, the profile is encrypted for transport between the target device and an initial node of the network through which the profile is transported. The encryption is an end-to-end inner layer encryption performed prior to hop-to-hop encryption. The encrypting uses a public key of a public, private key pair. The private key is derivable from a seed securely provisioned in the target device using a public key algorithm. The encrypted profile is transmitted over the communications network to the target device.

13 Claims, 5 Drawing Sheets

(51) Int. Cl.
*H04W 8/20* (2009.01)
*H04L 9/08* (2006.01)
*H04W 12/04* (2009.01)
*H04W 12/02* (2009.01)

(56) References Cited

U.S. PATENT DOCUMENTS

| | | | |
|---|---|---|---|
| 2005/0102523 A1 | 5/2005 | Harrison et al. | |
| 2006/0107285 A1* | 5/2006 | Medvinsky | 725/25 |
| 2006/0123117 A1* | 6/2006 | Heutchy et al. | 709/227 |
| 2008/0091723 A1* | 4/2008 | Zuckerberg et al. | 707/104.1 |
| 2009/0205028 A1 | 8/2009 | Smeets et al. | |
| 2010/0131764 A1* | 5/2010 | Goh | 713/171 |
| 2010/0150343 A1* | 6/2010 | Rombouts | 380/44 |
| 2010/0329455 A1 | 12/2010 | Nemiroff | |
| 2012/0047563 A1* | 2/2012 | Wheeler | 726/6 |
| 2012/0190354 A1* | 7/2012 | Merrien et al. | 455/422.1 |
| 2013/0091345 A1* | 4/2013 | Shroff et al. | 713/2 |
| 2013/0290713 A1* | 10/2013 | Zaverucha et al. | 713/168 |

OTHER PUBLICATIONS

Ge et al., "VisualSec: A Secure Message Delivery Scheme for Online Social Networks Based on Profile Images" Global Telecommunications Conference, 2009. GLOBECOM 2009. IEEE 2009 , pp. 1-6.*
Frank Sudholt: "Embedded SIM", 22. Frauhoffer-SmartCard Workshop 2012, Feb. 9, 2012, Retrieved from the Internet: URL:http://www.smartcard-workshop.de/content/dam/smartcard/de/documents/WSI2/20 WS2012 FolienEmbeddedSIM Sudholt.pdf, [retrieved on Jun. 28, 2013], all pages.
Certicom Research: "Standards for Efficient Cryptography 1 (SEC 1) version 2.0", May 21, 2009, Retrieved from Internet: URL:http://www.secg.org/download/aid-780/secl-v2.pdf [retrieved on Jun. 28, 2013], all pages.
Patent Cooperation Treaty, International Search Report and Written Opinion of the International Searching Authority for International Application No. PCT/US2013/035842, Jul. 6, 2013, 13 pages.

* cited by examiner

| Payload | Profile | Source Sig. | Int. #1 Sig. | Int. #2 Sig. | Int. #3 Sig. | Int. #4 Sig. |

112

EFFICIENT KEY GENERATOR FOR DISTRIBUTION OF SENSITIVE MATERIAL FROM MULTIPLE APPLICATION SERVICE PROVIDERS TO A SECURE ELEMENT SUCH AS A UNIVERSAL INTEGRATED CIRCUIT CARD (UICC)

RELATED APPLICATION

This application claims priority to provisional patent application Ser. No. 61/702,192, entitled "EFFICIENT KEY GENERATOR FOR DISTRIBUTION OF SENSITIVE MATERIAL TO MULTI-OWNER SECURE ELEMENTS".

BACKGROUND

Current smart-card technologies are moving towards non-removable embedded smart cards for use in mobile computing devices, such as mobile phones, tablet computers, and automobile navigation systems. Recent examples include embedded Universal Integrated Circuit Cards (UICC), which are used to host security-sensitive functions. Aside from smart cards, there is also a trend to use trusted environments to perform functions similar to functions currently performed by smart cards.

Non-removable, embedded smart cards and trusted environments, however, often need data to be provided to them after being embedded. Because of this, embedded smart cards and trusted environments are provided with sensitive data remotely. Providing sensitive data remotely, however, suffers from various security risks, communication complexities, and accountability uncertainties.

SUMMARY

Application service providers such as a mobile network operator (MNO), for example, generally need to remotely provision sensitive data into a secure execution environment of a target device such as a mobile computing device. Since a target device may obtain services from multiple application service providers, each of which may provision its own secure data into its own secure domain of the secure execution environment, the number of different secure domains may become large. This can present a challenge when the amount of resources and secure storage space in the secure execution environment is limited.

As detailed below, techniques and arrangements are provided which allow multiple application service providers to provision sensitive data, referred to herein as a profile, in a target device. A profile may include, by way of example, security application algorithm codes, data and cryptographic keys. Such provisioning may include the transport of encrypted profiles through the network, decryption of encrypted profiles within the secure execution environment, and installation of the profiles within a secure storage for later execution within the secure execution environment. Because profiles from multiple application service providers are to be resident in the same secure execution environment, knowledge of each profile should be isolated within a security domain (e.g., a logical segmentation of hardware resources segmented and isolated from other segments by a firewall or the like) designated for the application service provider that is associated with that profile.

The secure execution environment may include the above-noted embedded Universal Integrated Circuit Cards (UICC), other forms of embedded chips, various trusted environments, or even movable or non-embedded cards, such as SIM cards, or any of various devices or entities that may benefit from receiving sensitive data securely.

The following discussion first describes an operating environment, followed by example methods for employing the techniques in the environment, and then proceeds with an example device for employing the techniques.

DETAILED DESCRIPTION

Example Environment

Figures 1, 2:
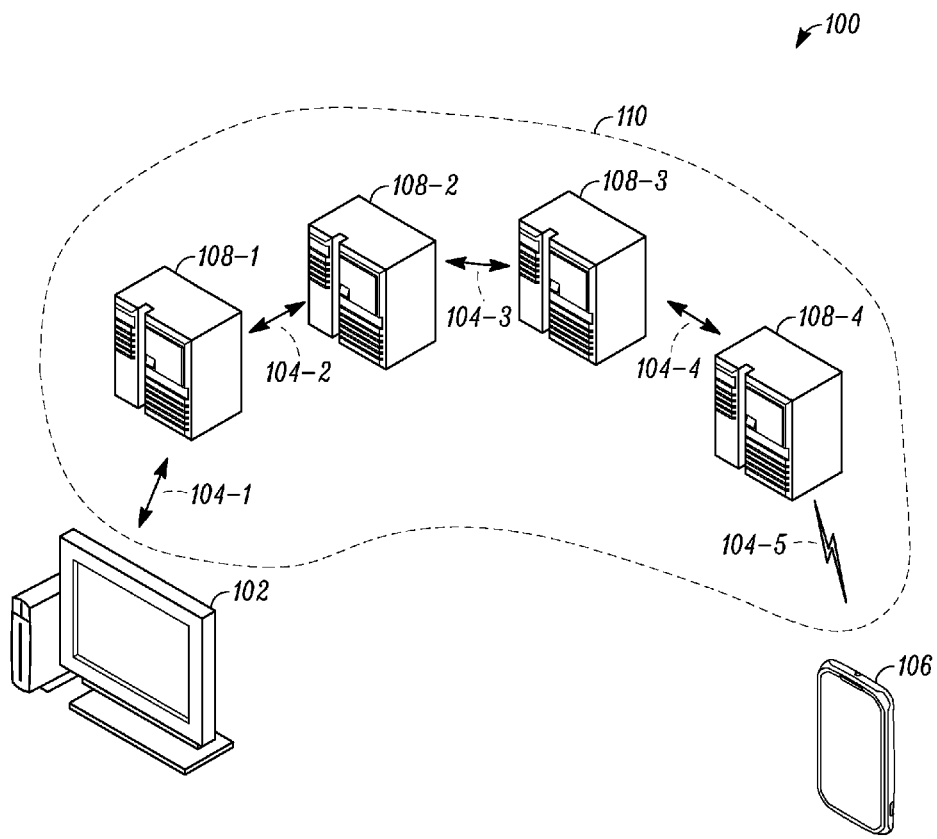
FIG. 1 illustrates an example environment in which techniques may be employed that enable multiple profiles provided by multiple application service providers to be securely transmitted to a target device.
FIG. 2 illustrates a simplified example of a packet that may be used to transmit the profile through the provisioning infrastructure shown in FIG. 1.

FIG. 1 illustrates an example environment 100 in which techniques may be employed that enable multiple profiles provided by multiple application service providers to be securely transmitted. Environment 100 includes a provisioning infrastructure that includes a source node 102, one or more wired and/or wireless communication networks 104, and intermediate nodes 108, shown at nodes 108-1, 108-2, 108-3, and 108-4. The provisioning infrastructure transmits the profiles to target device 106.

Generally, source node 102 is a source of sensitive data such as a profile intended for the target device 106. In some cases, source node 102 is associated with an ASP (e.g., a mobile network operator) in secure communication with a trusted one of the intermediate nodes 108 (e.g., node 108-1), such as a trusted subscription manager capable of end-to-end encryption of a packet having the sensitive data.

For purposes of illustration, source node 102 will be described as being associated with a mobile network operator, the trusted intermediate node is a subscription manager-data preparation (SM-DP), other intermediate nodes are non-serving subscription managers (SMs), and a last intermediate node, which is trusted by the target device 106, is a serving subscription manager-secure routing (SM-SR). In addition, the secure execution environment will often be described as a UICC. This is but one example of many cases where the techniques described herein may be employed. For instance, these same techniques may be used by a bank that provisions smart cards for mobile banking, a utility company that provisions smart meters for tracking utility consumption, or a content delivery provider that provisions a target device such as a set-top box to receive content from multiple content sources, where the content is protected by a Digital Rights Management (DRM) mechanism or a Conditional Access System (CAS).

Communication networks 104 can include one or multiple communication networks, each represented by networks 104-1, 104-2, 104-3, 104-4, and 104-5, though the term network may be a simple path between nodes or comprise a complex combination of wired and/or wireless communication channels having multiple networks (e.g., cellular, wired, and wireless local area). While not required, network 104-5 is illustrated as a wireless network, as this last hop is often a wireless transmission.

The secure transport of the profile through the provisioning infrastructure may require multiple layers of encryption. For instance, an inner layer encryption takes place at a subscription manager data preparation node (SM-DP) to provide end-to-end (i.e., SM-DP to target device) protection. An outer layer encryption may be performed over various hops (i.e., SM-SR) of the infrastructure. The outer layer encryption over each hop will be removed by the SM-SR at the end of each hop. Over the last hop between the serving SM-SR and the UICC, the outer layer encryption is removed by a general downloader function within the UICC, while leaving the inner layer encryption to take place in a security domain that is designated for a specific profile and is cryptographically separate. In this way the clear profile from one application service provider is not exposed to any other parts of the UICC (e.g. a security domain belonging to another application service provider).

Generally, target device 106 receives the profile in packets that are transmitted through a node path 110. As part of the outer layer encryption process the packets have a cryptographic signature for each node along the required node path. FIG. 2 illustrates a packet 112 in simplified form, which has cryptographic signatures from each of the intermediate nodes 108 ("Int. #1 Sig." etc.), as well as an end-to-end cryptographic signature (shown as "Source Sig."), which is signed over the payload (e.g., sensitive data), which may also include a profile. While each of the intermediate nodes 108 may cryptographically sign a packet as part of the outer layer encryption process, a required path node can be verified, in some embodiments, without a signature from those of the intermediate nodes that are trusted.

Inner Layer Encryption

As previously mentioned, a problem may arise when inner layer encryption is employed to secure multiple profiles within a common secure execution environment. For purposes of illustration and not as a limitation on the subject matter described herein, the secure execution environment will be described as a Universal Integrated Circuit Card (UICC) that is embedded in a target device. Likewise, the ASP which provides the profile will be referred to as an MNO.

A simple way to address this problem is to have a public, private key pair (denoted as PLK_UICC and PVK_UICC, respectively) for each UICC. The SM_DP associated with each MNO will either encrypt the profile with the PLK_UICC directly or encrypt the profile with a symmetric profile-encryption-key (PEK) and then in turn encrypt the PEK with the PLK_UICC.

A problem with this approach is scalability. Even if the same PEK is used for the entire UICC population for a given MNO (which presents a security risk), the SM-DP associated with the given ASP may have to encrypt profiles for millions of UICCs. Thus, the SM-DP would need to have access to millions of PLK_UICCs prior to the provisioning process, which may create significant database problems, even if the keys could be addressed using the UICC identifier (UICC_ID). Furthermore, the UICC manufacturer would have to ship lists of public keys (i.e., lists specifying PLK_UICC) to each MNO that needs to provision the UICC. The key list may also need to be kept secure to avoid malicious provisioning.

This problem of scalability can be addressed if each MNO uses a global key pair for an entire population of UICCs such as all UICCs of a given model. The public and private keys in this global key pair may be denoted MNO_PLK_UICCM and MNO_PVK_UICCM, respectively. In this way each MNO's SM-DP can use the same key to encrypt a profile (or a PEK) for all UICCs of the same model, but different MNOs will use different key pairs. This approach can significantly simplify the profile preparation process since a database search for individual UICC-unique public keys (PLKs) is not necessary.

Both with global MNO key pairs and unique UICC key pairs, there may be storage problems for memory-constrained UICCs, especially if RSA key pairs are used. A UICC potentially may have to contain a large number of key pairs, particularly if it is going to be used in a geographic region with a large number of MNOs such as in Western Europe, for example. Furthermore, if pre-loaded RSA key pairs are used for each MNO, new MNOs for which an RSA key pair had not been pre-loaded in the UICC would be excluded from serving the target device in which the UICC is employed. While it is possible to preload a number of RSA key pairs in UICCs and later assign the key pairs to a new MNO as needed, ultimately the storage space in the UICC would determine the maximum number of operators that can be supported.

Another alternative approach is to use public key algorithms that allow a private key to be generated as a random value. An example of such a public key algorithm is Elliptic Curve Cryptography (ECC). In contrast to RSA key pairs, where the key generation process involves the search for prime numbers with specific properties, ECC private keys (PVK) only have to be within a specific range and, once the ECC_PVK and the ECC curve are known, the ECC public key (PLK) can be generated simply by having knowledge of the PVK and the ECC curve.

To generate ECC private keys within the UICC, a private seed that is unique to each UICC can be loaded within each UICC. In some implementations the seed can be generated by the UICC manufacturer and loaded into the UICC within the UICC manufacturing facility such that once it is loaded it cannot be extracted and will only be known to the UICC manufacturer and the secure execution engine within the UICC. In one particular implementation a new ECC private key (MNO_ECC_PVKDEV) can be calculated as follows using as input a key generation function (KGF) and an MNO identifier (MNO_ID):

$$MNO\_ECC\_PVKDEV = KGF(private\_seed, MNO\_ID)$$

As previously mentioned, the corresponding ECC public key can be created from the ECC private key and the ECC curve using Elliptic Curve multiplication operation:

$$MNO\_ECC\_PLKDEV = MNO\_ECC\_PVKDEV * G$$

where G is the Elliptic Curve base point.

In some cases, for a highly robust implementation a hardware key ladder may be implemented such that both the seed and the PVK cannot be exposed without hardware tampering. The KGF may be proprietary or a well-established function. For example, the KGF can be a standard MAC (Message Authentication Code) function such as HMAC-SHA1, HMAC-SHA256, AES-CMAC, and so on. The KGF should be chosen such that it generates a key of sufficient size which matches the Elliptic Curve parameters.

Since the UICC only needs to store the seed it is able to save significant storage space (in comparison to the amount of storage space needed to store multiple RSA PVKs for multiple MNOs as well as certificates for those MNOs). Using the seed and the MNO_ID, the UICC is able to generate the MNO_ECC_PVKDEV and then, using the ECC curve, the UICC is able to create the associated MNO_ECC_PLKDEV.

An MNO that intends to provision a population of UICCs with profiles contacts the UICC manufacturer or vendor for a list of key pairs that is specific to that MNO. Accordingly, the UICC manufacturer or vendor creates a private, public key pair (MNO_ECC_PVKDEV, MNO_ECC_PLKDEV) based on the private seeds and then sends the public key list (the list of MNO_ECC_PLKDEV) to the SM-DP associated with that MNO.

As an authentication measure, the list of public keys may be kept secret. If the key list were public, any party could use a public MNO_ECC_PLKDEV to encrypt an illegitimate profile and send it to a UICC. To avoid such an attack, the MNO SM-DP would have to sign the encrypted profile. However, the verification of this signature would require installation of MNO SM-DP certificates for every single MNO/SM-DP within the UICC, which would defeat the purpose of using ECC and private seeds for storage space optimization. Accordingly, by maintaining the public key list in secret the use of a signature can be avoided.

To be able to establish a profile encryption key (PEK) using ECC, a key agreement exchange may take place between the MNO SM-DP and each UICC. One example of a key exchange algorithm that may be employed is an Elliptic Curve Diffie-Hellman exchange (ECDH) algorithm where both the UICC and the MNO end up with exactly the same Shared ECDH secret (using Elliptic Curve multiplication operation):

Calculated by UICC: Shared ECDH
Secret=MNO_ECC_PLK*MNO_ECC_PVKDEV

Calculated by MNO: Shared ECDH
Secret=MNO_ECC_PLKDEV*MNO_ECC_PVK

Figure 3:
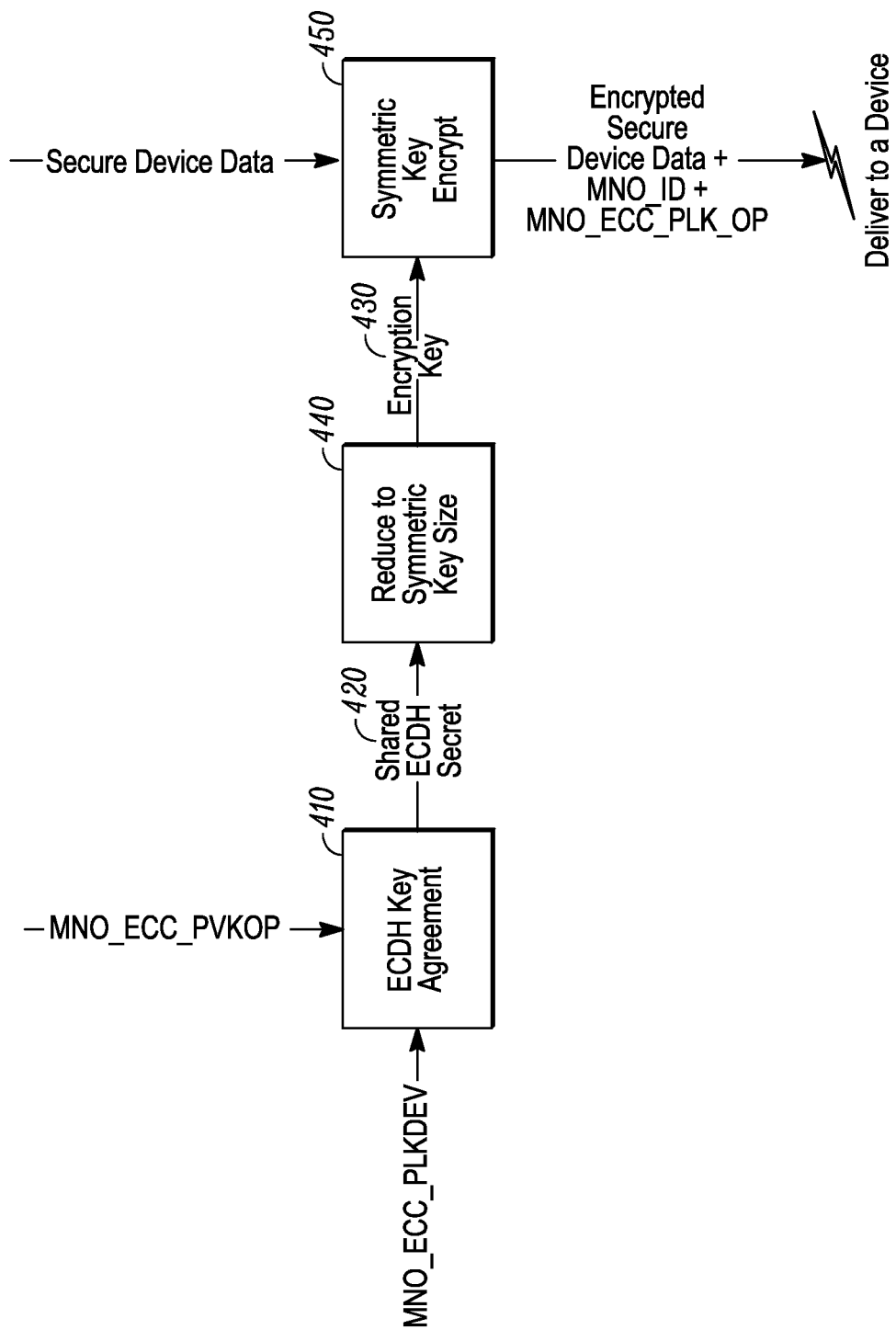
FIG. 3 illustrates one example of a key generation process that may be used to encrypt a profile using a key agreement exchange process performed by the SM-DP shown in FIG. 1.

The key generation process shown in FIG. 3 may be used to encrypt a profile using a key agreement exchange process performed by the MNO's SM-DP. As part of this process the SM-DP generates its own ECC private, public key pair (denoted MNO_ECC_PVKOP and MNO_ECC_PLKOP, respectively). This key pair may be unique for each UICC, a population of UICCs, or each ECDH process that is performed. The SM-DP will then use its own ECC private key (MNO_ECC_PVKOP) and the UICC public key (MNO_ECC_PLKDEV), which is provided by the public key list from UICC manufacturer or vendor, to perform a local ECDH key agreement 410 and create the PEK 430 from a shared ECDH secret 420. In some cases a key size reduction process 440 may be performed when generating the PEK 430, depending on the key size that is needed to encrypt the profile. The SM-DP then uses the PEK to perform a symmetric key encryption process 450 to encrypt the profile for the UICC. Finally, the encrypted profile, along with the MNO device identifier (MNO_ID) and the MNO ECC public key (MNO_ECC_PLKOP) are delivered to the target device of the provisioning infrastructure shown in FIG. 1.

Figure 4:
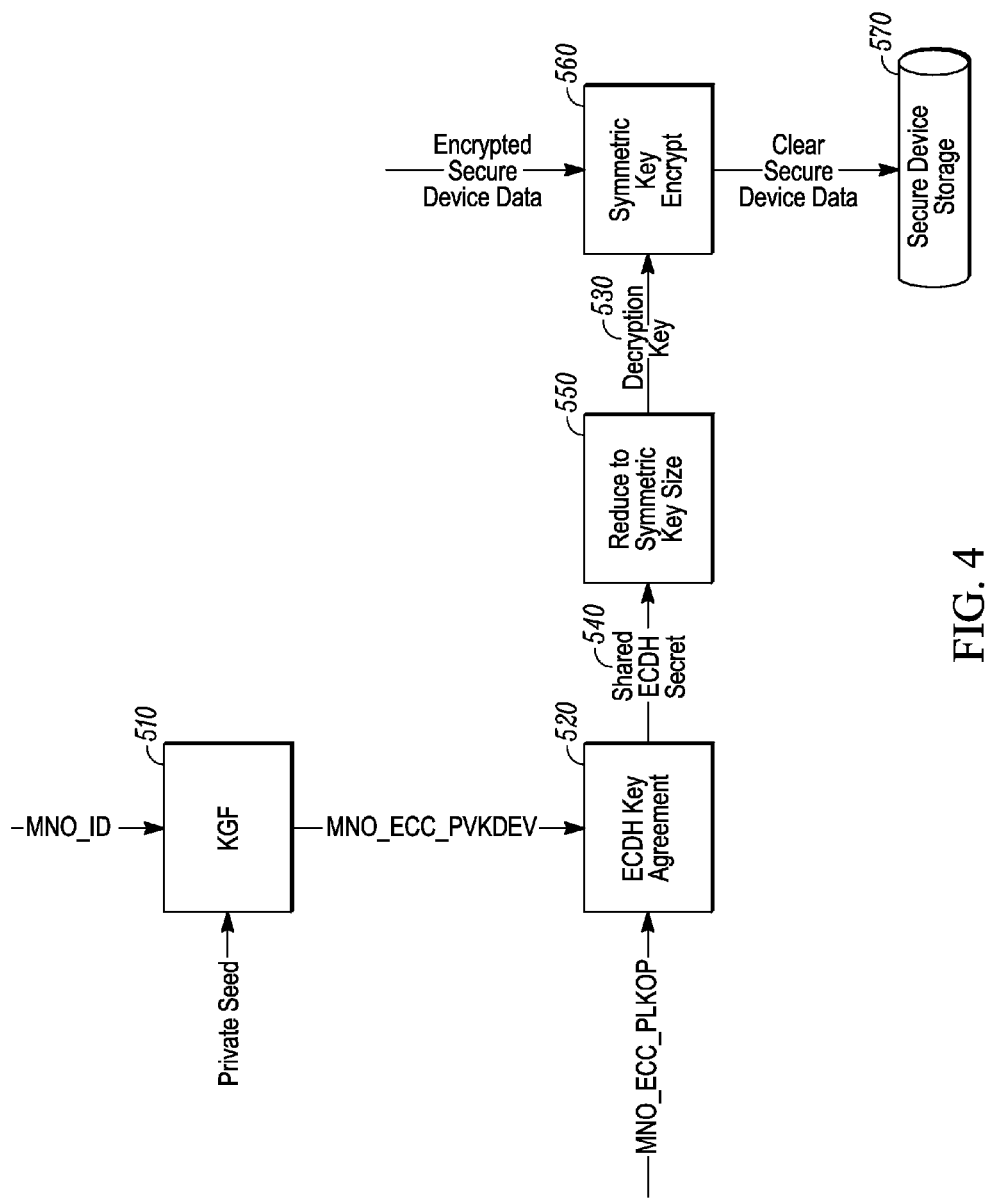
FIG. 4 illustrates one example of an inner layer decryption process that may be performed by a target device to obtain the decrypted profile.

Once the UICC receives the inner layer encrypted profile it performs a decryption process to remove the inner layer encryption, as illustrated in FIG. 4. As shown, the UICC uses its private seed and the MNO identifier (MN_ID) to generate its own ECC private key (MNO_ECC_PVKDEV) using the pre-configured key generator function (KGF) 510. The UICC then creates the PEK to perform decryption. To create the PEK, the UICC uses the device ECC private key for this particular MNO (MNO_ECC_PVKDEV) and the MNO ECC public key (MNO_ECC_PLKOP) to perform a local ECDH key agreement process 520. As discussed above in connection with FIG. 3, the UICC can obtain the MNO ECC public key (MNO_ECC_PLKOP) from the MNO along with the encrypted data, especially in cases where the MNO uses a unique public key for each UICC. Alternatively, the MNO ECC public key may be obtained by the UICC through other means. For example, the MNO ECC public key may be pre-provisioned in the UICC. The local ECDH key agreement process 520 creates the PEK 530 from a shared ECDH secret 540. In some cases a key size reduction process 550 may be performed when generating the PEK 530, depending on the key size that is needed to encrypt the profile. The UICC then uses the PEK 530 to perform a symmetric key decryption process 560 to decrypt the profile, which is stored in secure storage device 570 associated with the UICC.

One advantage of the provisioning process described above is that a priori knowledge of the MNOs that may need to interact with the UICC is not needed when the UICC is manufactured. This allows the business ecosystem within which the UICC is used to be extended in a flexible manner. In essence, there is practically no limit on the number of MNOs the ecosystem can support. In practice the limit will be determined by the number of key pairs that can be generated from the ECC curve, which is a very large number compared to the possible number of MNOs.

A potential downside to this provisioning process, however, is that the UICC manufacturer needs to create a unique private seed for each UICC and then store the seeds in a seed list. Alternatively, all MNOs could agree to use a common Root Certificate Authority (CA) and sign their encrypted profiles using a certificate that chains to this common Root CA. While this would address the problem, in practice it can be difficult to establish a common business and legal entity that would function as a Root Certificate Authority.

Instead of using a unique private seed for each UICC, another solution is to use a global private seed for a population of UICC models and then use the UICC identifier (UICC_ID) in the calculation of the ECC private key for each UICC. That is, the private key MNO_ECC_PVKDEV for each UICC may be generated using a key generation function (KGF) as follows:

MNO_ECC_PVKDEV=KGF(UICCM_private_seed, UICC_ID,MNO_ID)

A weakness of this alternative approach is that if the private_seed for a particular UICC model is exposed, then the entire population of UICCs will be compromised for all the MNOs involved.

It should be noted that the UICC does not need to calculate the public key for the MNO, since it only needs to decrypt the profile encrypted by MNO's SM-DP. The public key list for each MNO may be signed by the UICC manufacturer or vendor prior to shipment to the MNO's SM-DP. In addition, the public key list may need to be encrypted in order to keep it secret. One downside to this solution is that the UICC manufacturer or vendor is fully trusted with both the private and public key pairs and thus plays a significant trusted role in the ecosystem. This is, however, also the case with existing UICC vendors.

The encryption algorithm described above employs Elliptic Curve Cryptography (ECC) as the public key agreement algorithm which is used to randomly generate a private key. Of course, other public key agreement algorithm may be employed instead. For instance, in one implementation an alternative key agreement algorithm that may be employed is the Diffie-Hellman algorithm where the private key MNO_DH_PVKDEV may be derived from a random seed and the public key is generated using:

MNO_DH_PVKDEV=KGF(private_seed,MNO_ID)

MNO_DH_PLKDEV=$g^{MNO\_DH\_PVKDEV} \bmod p$

And then Diffie-Hellman key agreement is performed as follows where both the UICC and the MNO end up with exactly the same Shared DH secret:

Calculated by UICC: Shared DH Secret=MNO_DH_PLK$^{MNO\_DH\_PVKDEV}$ mod $p$

Calculated by MNO: Shared DH Secret=MNO_DH_PLKDEV$^{MNO\_DH\_PVK}$ mod $p$ where g is called a generator and p is a large prime number, typically at least 1024 bits long and where MNO_DH_PLKDEV is UICC's Diffie-Hellman public key, MNO_DH_PVK is the DH private key which belongs to the MNO and MNO_DH_PLK is the corresponding MNO public key.

This algorithm may be used instead of the ECC algorithm described above in connection with the encryption and decryption processes shown in FIGS. 3 and 4, respectively.

It should also be noted that an MNO-specific boot code may be provided along with, or as a part of, the profile. In either case the boot code may be encrypted along with the profile itself. In such a case the UICC may use the PEK to decrypt both the boot code and the profile, possibly in the same step.

Replay Protection

In some cases it may be undesirable to allow the same encrypted profile to be retransmitted to the same target device without permission. However, there may be legitimate reasons to change the profile of a target device and thus a cryptographic enforcement technique may be employed to prevent retransmission of an old profile. One such enforcement technique may employ a random value (i.e., a nonce) that is included in a message sent to the MNO by the target device requesting a profile. The reply to the target device should include both the encrypted profile and the random value encrypted together with that profile. When the target device later decrypts the profile, it verifies that the random value matches the value included in the request message. If there is no match, it disregards the profile.

This cryptographic enforcement technique requires two-way communication between the target device and the MNO. However, some target devices may only be capable of receiving a broadcast or a multicast and have no way to send a request to the MNO. In this case, the MNO can include either a sequence number or a timestamp within the encrypted profile. A target device can persistently store this value and ensure that each successive profile update contains either a nonce or a timestamp that is greater than the previously received value.

Example Target Device

Figure 5:
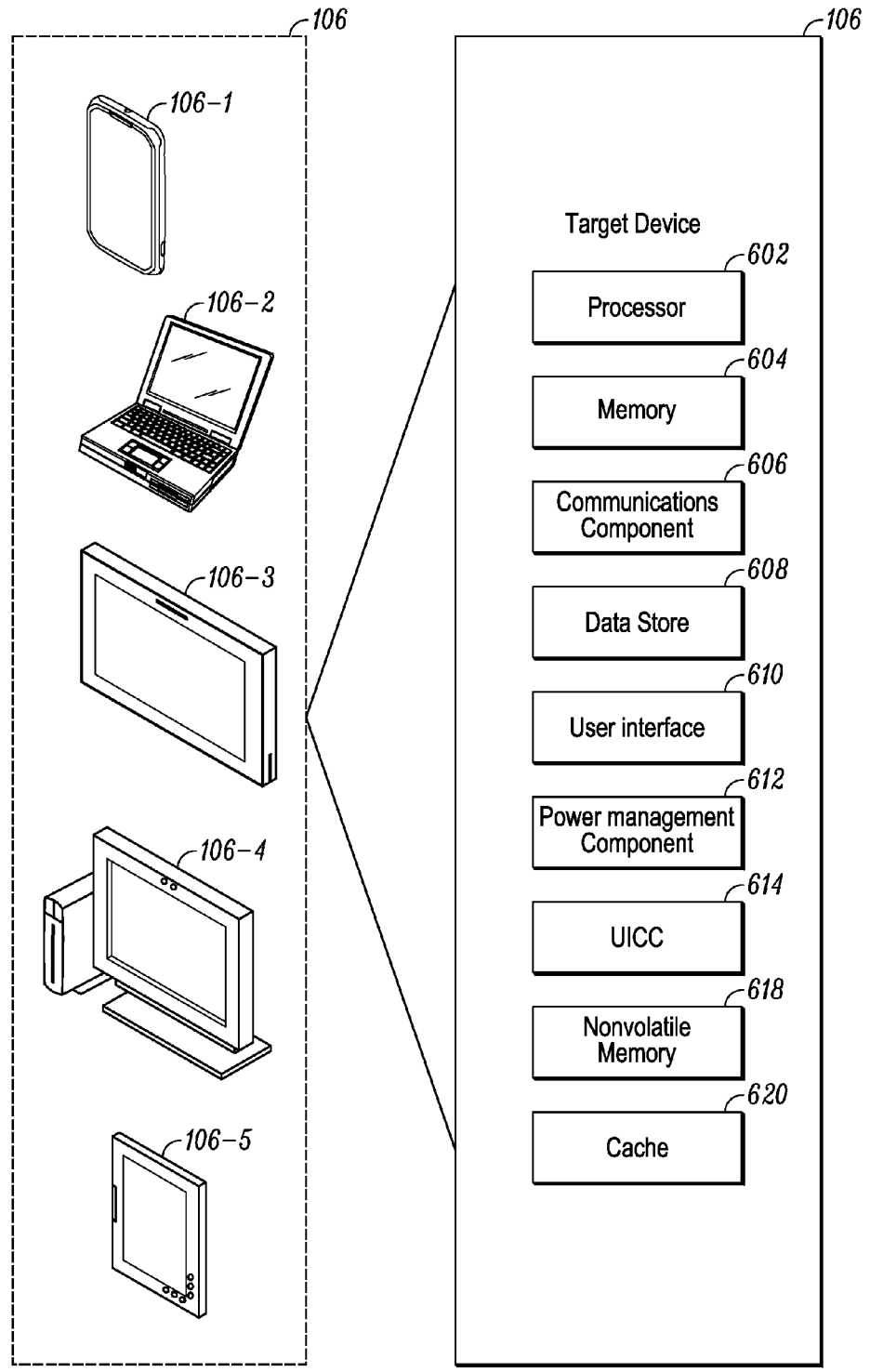
FIG. 5 illustrates one example of a target device.

FIG. 5 illustrates one example of target device 106. Target device 106 can be one or a combination of various devices, here illustrated with six examples: a smartphone 106-1, a laptop computer 106-2, a television 106-3, a desktop computer 106-4, and a tablet computer 106-5, though other computing devices and systems, such as netbooks, car navigation systems, and servers may also be used.

Target device 106 includes a processor 602 for carrying out processing functions associated with one or more of components and functions described herein. Processor 602 can include a single or multiple set of processors or multi-core processors. Moreover, processor 602 can be implemented as an integrated processing system and/or a distributed processing system. Furthermore, processor 602 may house, execute, and/or process instructions related to reading and writing information to and from the target device 106 and/or the components contained therein. For example, in an aspect, processor 602 may generate and send instructions to the UICC 614, cache 620, or memory 604 in the target device 106 to cause a cache to be written to or updated with information that has been read from the UICC 614. Moreover, processor 602 may generate and send commands to a power management component on the target device.

Target device 106 further includes a memory 604, such as a computer-readable storage medium for storing data used herein and/or local versions of applications being executed by processor 602. Memory 604 can include any type of memory usable by a computer, such as random access memory (RAM), read only memory (ROM), tapes, magnetic discs, optical discs, volatile memory, non-volatile memory, and any combination thereof.

Further, target device 106 includes a communications component 606 that provides for establishing and maintaining communications with one or more parties utilizing hardware, software, and services as described herein. Communications component 606 may carry communications between components on target device 106, as well as between target device 106 and external devices, such as devices located across a communications network and/or devices serially or locally connected to target device 106. For example, communications component 606 may include one or more buses, and may further include transmit chain components and receive chain components associated with a transmitter and receiver, respectively, operable for interfacing with external devices.

Additionally, target device 106 may include a data store 608, which can be any suitable combination of hardware and/or software, that provides for mass storage of information, databases, and programs employed in connection with aspects described herein. For example, data store 608 may be a data repository for applications not currently being executed by processor 602.

Target device 106 may additionally include a user interface component 610 operable to receive inputs from a user of target device 106, and further operable to generate outputs for presentation to the user. User interface component 610 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Target device 106 also includes a UICC 614, which may contain subscription, connection, or other information related to wireless communication with a wireless network. In some examples, UICC 614 may be removable, meaning that it may be detached from the target device 106 if removal is needed. In a further aspect, UICC 614 may store personal data for a user. Additionally, the UICC may contain a subscriber identity module (SIM) application, a universal subscriber identity module (USIM), and/or a CDMA subscriber identity module (CSIM) application for network authentication purposes. In some aspects, UICC 614 may contain a removable user identity module (R-UIM), or may itself be referred to as an R-UIM. In some examples, UICC 614 may include an internal central processing unit (CPU), random access memory (RAM), read-only memory (ROM), electrically-erasable programmable read only memory (EEPROM), other non-volatile or volatile memory, and/or input/output circuitry. Additionally, the UICC may contain information related to radio access networks utilizing several access technologies and/or communication protocols, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

Target device 106 may include a power management component 612 for switching power to UICC 514 on and off. Power management component 612 may receive instructions for switching power to the UICC 614 on and off from processor 602 or any other component in target device 106 and/or components external to target device 106, such as network components.

Target device 106 may include a nonvolatile memory (NV) component 618. In an aspect, the NV may contain subscription, connection, or any information related to establishing a connection with a wireless network or authenticating a user to such a network. By non-limiting example, such a wireless network may utilize an access technology and/or communication protocol or standard such as, but not limited to, CDMA2000 1X (IS-2000), 1x, 1xRTT, CDMA2000, and/or 1xEV-DO (Evolution-Data Optimized), also known as EV-DO or EV, or any other access technology that is part of the 3G access technology family.

Target device 106 may contain a cache 620, which may store information recently read from UICC 614. Cache 620 may include memory for storing such information, which may any type of memory usable by a computer, such as RAM, ROM, EEPROM, tapes, magnetic discs, optical discs, volatile memory, a general non-volatile memory. In an aspect, cache 620 may include NV 618, and therefore may store contain subscription, connection, or any information related to establishing a connection with a wireless network or authenticating a user to such a network. Again, by non-limiting example, such a wireless network may utilize an access technology and/or communication protocol or standard such as, but not limited to, CDMA2000 1x (IS-2000), 1x, 1xRTT, CDMA2000, and/or 1xEV-DO (Evolution-Data Optimized), also known as EV-DO or EV, or any other access technology that is part of the 3G access technology family. Additionally, because it may contain subscription information read from UICC 614 in the past, cache 620 may include information stored on the UICC 614, such as, but not limited to information related to radio access networks utilizing several access technologies and/or communication protocols, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

As previously mentioned, instead of a UICC, the target device 106 may include other forms of embedded chips, various trusted environments, or even movable or non-embedded cards, such as SIM cards.

Example Node

Figure 6:
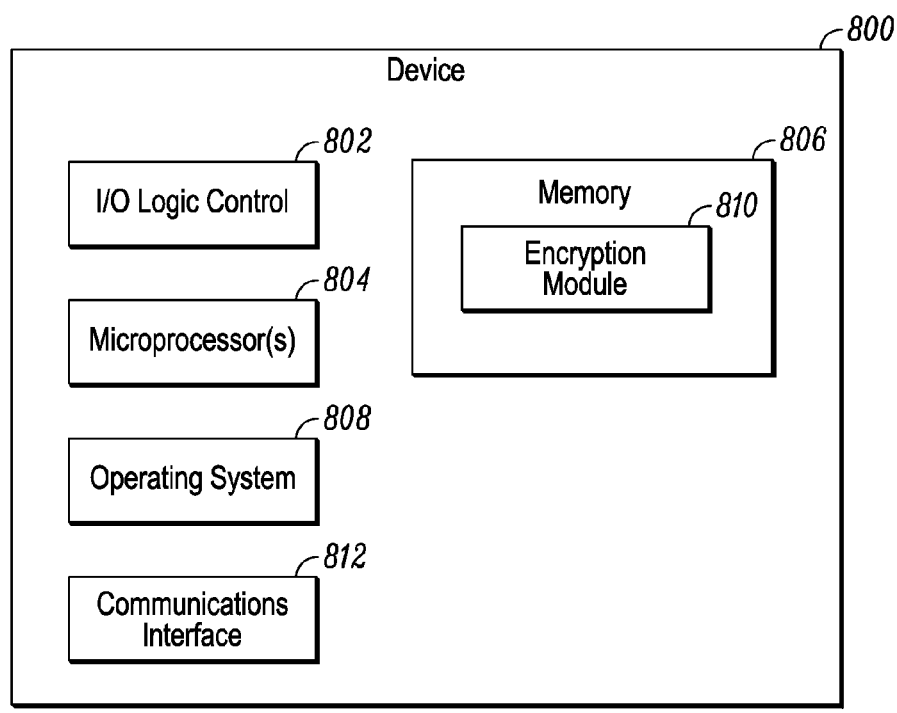
FIG. 6 shows one example of a computing device that may be employed as a source node and/or an intermediate node used in the provisioning infrastructure of FIG. 1.

FIG. 6 shows one example of a computing device 800 that may be employed as a node (e.g., source node 102 and/or intermediate nodes 108 of FIG. 1) in the provisioning infrastructure of FIG. 1. Computing device 800 can be integrated with electronic circuitry, a microprocessor, memory, input-output (I/O) logic control, communication interfaces and components, other hardware, firmware, and/or software needed to run an entire device. Computing device 800 can also include an integrated data bus (not shown) that couples the various components of the computing device for data communication between the components.

Computing device 800 includes various components such as an input-output (I/O) logic control 802, microprocessor(s) 804 (e.g., a microcontroller or digital signal processor), operating system 808 and communications interface 812. Computing device 800 also includes a memory 806, which can be any type of random access memory (RAM), a low-latency nonvolatile memory (e.g., flash memory), read only memory (ROM), and/or other suitable electronic data storage. Memory 806 includes or has access to encryption module 810, which may be used to perform inner and/or outer encryption.

Computing device 800 can also include various firmware and/or software, such as an operating system 808, which, along with other components, can be computer-executable instructions maintained by memory 806 and executed by microprocessor 804. Computing device 800 can also include other various communication interfaces 810 and components, wireless LAN (WLAN) or wireless PAN (WPAN) components, other hardware, firmware, and/or software.

Other example capabilities and functions of these modules and components are described with reference to components shown in FIGS. 1, 2, and 3. These modules and components, either independently or in combination with other modules or components, can be implemented as computer-executable instructions maintained by memory 806 and executed by microprocessor 804 to implement various embodiments and/or or features described herein. Alternatively or additionally, any or all of these components can be implemented as hardware, firmware, fixed logic circuitry, or any combination thereof that is implemented in connection with the I/O logic control 802 and/or other signal processing and control circuits of example device 800. Furthermore, some of these components may act separate from device 800.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. A method for providing end-to-end security for transport of a profile associated with a particular service provider to a target device over at least one communications network that includes a plurality of nodes, the method comprising:
encrypting the profile between the target device and an initial node of the network through which the profile is transported, the encryption being an end-to-end inner layer encryption performed prior to hop-to-hop encryption, the encrypting using a device public key of a device public, private key pair, the device private key being derivable from a seed that is unique to a secure element of the target device and securely provisioned in the secure element and a service provider identifier associated with the particular service provider using a key generation function;
using the device public key and a service provider private key to perform key agreement to create a profile encryption key that is used to encrypt the profile; and transmitting the encrypted profile over the at least one communications network to the target device,
wherein a service provider key pair that includes the service provider private key is unique to a particular population of secure elements respectively located in a population of target devices, wherein a decryption key is calculable by the target device from the device private key and a service provider public key in the service provider key pair.

2. The method of claim 1 wherein a key agreement algorithm used to perform the key agreement is based on Elliptic Curve Diffie-Hellman, the device public key being derivable from the device private key and an ECC curve.

3. The method of claim 1 wherein the seed is common to particular population of secure elements, a unique private key being derivable from the seed, a unique identifier associated with the secure element and the service provider identifier.

4. The method of claim 2 wherein the public key algorithm is implemented using hardware.

5. The method of claim 1 further comprising maintaining in secret a list of public keys that includes the device public key of the device public, private key pair, the list of public keys being received by a service provider delivering at least one service to a plurality of target devices in which a plurality of secure elements are respectively located, the list of public keys being received from a manufacturer or vendor of the plurality of secure elements.

6. The method of claim 5 wherein the list of public keys is digitally signed by the manufacturer or vendor.

7. The method of claim 1 wherein the service provider public key in the service provider key pair belonging to the particular service provider is pre-provisioned in the target device.

8. The method of claim 1 wherein the service provider public key in the service provider key pair belonging to the particular service provider is transmitted to the target device along with the encrypted profile.

9. The method of claim 1 wherein a key agreement algorithm used to perform the key agreement is Diffie-Hellman, the device public key being derivable from the device private key and Diffie-Hellman group parameters g (generator) and p (prime).

10. The method of claim 1 further comprising:
receiving a request for the profile from the target device, the request including a nonce;
encrypting the nonce with the profile; and
transmitting the encrypted profile and the encrypted nonce over the at least one communications network to the target device.

11. The method of claim 1 wherein the encrypted profile includes a timestamp or a sequence number.

12. The method of claim 1 wherein the profile is encrypted by a mobile network provider.

13. The method of claim 12 wherein the secure element is a Universal Integrated Circuit Card (UICC).

* * * * *